US011253888B2

(12) United States Patent
De Fillippi et al.

(10) Patent No.: US 11,253,888 B2
(45) Date of Patent: Feb. 22, 2022

(54) METHOD AND INSTALLATION FOR PAINTING A SURFACE OF A COMPONENT WITH A PATTERN

(71) Applicant: EXEL INDUSTRIES, Epernay (FR)

(72) Inventors: Mike De Fillippi, Paris (FR); Cyrille Medard, Paris (FR); Philippe Provenaz, Paris (FR); Sebastien Salze, Paris (FR)

(73) Assignee: EXEL INDUSTRIES, Epernay (FR)

( * ) Notice: Subject to any disclaimer, the term of this patent is extended or adjusted under 35 U.S.C. 154(b) by 431 days.

(21) Appl. No.: 15/716,807

(22) Filed: Sep. 27, 2017

(65) Prior Publication Data

US 2018/0099309 A1 Apr. 12, 2018

(30) Foreign Application Priority Data

Oct. 6, 2016 (EP) .................................... 16306321

(51) Int. Cl.

*B01D 1/30* (2006.01)
*B05D 1/32* (2006.01)
*B05B 16/20* (2018.01)
*B05B 12/16* (2018.01)
*B05D 3/02* (2006.01)

(Continued)

(52) U.S. Cl.

CPC ................ *B05D 1/32* (2013.01); *B05B 12/16* (2018.02); *B05B 16/20* (2018.02); *B05D 1/325* (2013.01); *B05D 3/02* (2013.01); *B05D 7/57* (2013.01); *B05D 7/14* (2013.01); *B05D 7/574* (2013.01)

(58) Field of Classification Search

CPC ...................................................... B05D 1/322
See application file for complete search history.

(56) References Cited

U.S. PATENT DOCUMENTS 2,286,473 A * 6/1942 James ..................... F16B 47/00 118/505
2,363,842 A * 11/1944 James ..................... B05B 12/20 118/505

(Continued)

FOREIGN PATENT DOCUMENTS

CN 101232050 A 7/2008
CN 102886678 A 1/2013

(Continued)

OTHER PUBLICATIONS

European Search Report issued in connection with European patent application No. 16306321.7, dated Mar. 21, 2017, 5 pages.

*Primary Examiner* — Cachet I Proctor
(74) *Attorney, Agent, or Firm* — Duane Morris LLP

(57) ABSTRACT

This method for painting a surface (S62) of a component (6) with a pattern includes at least the following steps consisting in applying a first coating product on at least a portion of the surface, automatically applying at least one portion of a mask (12) on a portion (Z62) of the surface, applying a second coating product and on the surface and removing the mask (12). Preferably, the mask (12) is at least partially automatically applied in the form of at least one layer (122, 124, 126) of non-atomized fluid, the layer being obtained by moving (A1) an applicator (16) delivering the non-atomized fluid along the portion (Z62) of the surface (S62) where the mask (12) is to be applied.

17 Claims, 6 Drawing Sheets

(51) Int. Cl.
*B05D 7/00* (2006.01)
*B05D 7/14* (2006.01)

(56) References Cited

U.S. PATENT DOCUMENTS

| | | | | | |
|---|---|---|---|---|---|
| 4,578,281 | A * | 3/1986 | Ebisawa | B05D 1/325 | 427/154 |
| 4,877,652 | A * | 10/1989 | Sparling, II | B05D 1/325 | 427/264 |
| 4,915,058 | A * | 4/1990 | Murray | B05B 12/20 | 118/505 |
| 4,974,532 | A * | 12/1990 | March | B05B 12/22 | 118/301 |
| 5,143,949 | A * | 9/1992 | Grogan | C09D 5/008 | 427/154 |
| 5,168,636 | A * | 12/1992 | Golden | B43L 13/201 | 101/127.1 |
| 5,175,018 | A * | 12/1992 | Lee | B05B 13/0431 | 427/8 |
| 5,709,909 | A * | 1/1998 | Leibfarth | B05D 7/02 | 427/407.1 |
| 5,741,383 | A * | 4/1998 | Kneisel | C03C 27/048 | 156/108 |
| 5,962,072 | A * | 10/1999 | Yerman | B05B 12/20 | 427/282 |
| 5,968,657 | A * | 10/1999 | Scullin | B32B 27/36 | 428/423.1 |
| 6,376,016 | B1 * | 4/2002 | Farquhar | B05D 5/06 | 427/258 |
| 6,451,117 | B1 * | 9/2002 | Farquhar | B05B 5/087 | 118/504 |
| 6,773,746 | B1 * | 8/2004 | Bell | B05D 1/327 | 427/154 |
| 6,773,804 | B2 * | 8/2004 | Enlow | B05D 1/265 | 428/327 |
| 7,943,197 | B2 * | 5/2011 | Lieverz | B05D 5/06 | 427/282 |
| 8,251,010 | B2 | 8/2012 | Sasaki et al. | | |
| 8,614,004 | B2 * | 12/2013 | Brier | B05D 7/574 | 428/457 |
| 8,662,485 | B2 * | 3/2014 | Asada | H01L 21/6838 | 269/21 |
| 8,951,613 | B2 * | 2/2015 | Adams | B05D 5/063 | 427/402 |
| 9,555,441 | B2 * | 1/2017 | Rouaud | B05D 1/32 | |
| 9,744,560 | B2 * | 8/2017 | Fritz | B05D 7/577 | |
| 9,956,569 | B2 * | 5/2018 | Jimenez Ramos | B05B 3/00 | |
| 2004/0175551 | A1 * | 9/2004 | Dunlop | B05D 7/577 | 428/212 |
| 2005/0158522 | A1 | 7/2005 | Lieverz et al. | | |
| 2006/0003177 | A1 * | 1/2006 | Smith | B32B 7/06 | 428/500 |
| 2006/0045965 | A1 * | 3/2006 | Lin | B05D 7/577 | 427/162 |
| 2006/0240338 | A1 * | 10/2006 | Satoh | H01L 21/76838 | 430/5 |
| 2007/0248830 | A1 * | 10/2007 | Brier | B05D 1/32 | 428/457 |
| 2009/0104355 | A1 * | 4/2009 | Nakazawa | B05D 3/002 | 427/299 |
| 2010/0212586 | A1 | 8/2010 | Sasaki et al. | | |
| 2013/0020457 | A1 | 1/2013 | Lin et al. | | |
| 2015/0367620 | A1 * | 12/2015 | DeFillipi | B05C 5/0216 | 156/244.11 |
| 2018/0036766 | A1 * | 2/2018 | Vidal | B05D 1/265 | |

FOREIGN PATENT DOCUMENTS

| | | | |
|---|---|---|---|
| DE | 10134574 | A1 | 2/2002 |
| EP | 1911527 | A1 | 4/2008 |
| JP | 1996500321 | A | 1/1996 |
| JP | 1996332449 | A | 12/1996 |
| JP | 1999028418 | A | 2/1999 |
| JP | 2005185923 | A | 7/2005 |
| WO | 9404470 | A1 | 3/1994 |

* cited by examiner

METHOD AND INSTALLATION FOR PAINTING A SURFACE OF A COMPONENT WITH A PATTERN

TECHNICAL FIELD OF THE INVENTION

This invention relates to a method and an installation for painting a surface of a component with a predetermined pattern.

The invention belongs to the technical field of painting, more particularly to the technical field of customization and personalization of painted surfaces of manufactured objects, such as automotive vehicles, aircraft fuselages and household equipments.

BACKGROUND OF THE INVENTION

Nowadays, automotive vehicle manufacturers tend to propose vehicles more and more adapted to the wishes of their clients, in particular two-tones vehicles, for instance with a roof painted in a color different from the sides of the vehicle. The tendency is also to offer vehicles varnished with different effects such as shining effect, mat effect or structured effect. In the car industry, other decoration elements are also proposed, such as stripes on the hood of a vehicle.

It is also known to customize the fuselage of a commercial aircraft with a pattern, such as the logo of an airline or such as maintenance or safety instructions.

The trend to customization of manufactured products is also observed in the field of household equipment.

The most common process for realizing a two-tones vehicle starts with painting the vehicle body with a base coat having the dominant color, possibly apply a clear coat and bake the vehicle body. Thereafter, a mask is manually applied on the surfaces of the vehicle body that should remain with this dominant color and the remaining surface, not covered by the mask, is painted with another color, via conventional paint applicators such as air spray, airmix or airless guns or rotary atomizers. At the end of the process, the mask is removed. Such masking and un-masking operations are performed manually and require a large amount of skilled manpower because the limit between the two coatings with different colors must be sharp and well positioned. No imperfection, such as a wavy line, should be detected with human eye and the second coating should not migrate below the mask.

US-A-2016/0001322 discloses a painting method where a pattern is applied on a base coat layer without an intermediate clear coat layer. Such an approach still needs the zone where the pattern is to be realized to be defined by a mask which is immobilized, via known techniques, on the objet to be painted. This induces the above listed inconvenients in particular, in terms of needs for a substantial amount of skilled manpower.

On the other hand, U.S. Pat. No. 5,175,018 teaches how to prevent over-spray from a coating procedure without applying masking tape and paper, by using an air curtain mask emitted by an air jet nozzle. Air continuously flows on the region to be protected from a coating applied at the same time. This approach cannot guarantee that the projected region is not polluted by the coating.

SUMMARY OF THE INVENTION

The invention aims at solving these problems with a new method for painting a surface of a component with a pattern, where a mask can be automatically applied by a robot, which allows saving time, increasing the reproducibility and decreasing the manpower cost.

To this end, the invention concerns a method for painting a surface of a component with a pattern, this method including at least the following successive steps consisting in:

a) applying a first coating product on at least a portion of the surface, b) automatically applying at least one portion of a mask on a portion of the surface, c) applying a second coating product on at least a portion of the surface without mask and d) removing the mask.

Thanks to the automatic application of the mask, one does not need operators to work manually around the objects to be painted, such as automotive vehicle bodies in a paint shop, which decreases the needs for a highly qualified manpower and the risks of human errors.

According to further aspects of the invention which are advantageous but not compulsory, this painting method might incorporate one or several of the features of one of claims 2 to 14, taken in any admissible combination.

In particular, during step b), the mask can be at least partially applied in the form of at least one layer of a non-atomized fluid, said layer being obtained by moving an applicator delivering the non-atomized fluid along the portion of the surface where the mask is to be applied. Thanks to this aspect of the invention, the mask can be created by moving the applicator with respect to the surface in order to cover a portion of the surface where the mask is to be applied with adjacent layers together forming the mask. Alternatively, the layer(s) can form an end portion of the mask, whose other part is made by a rigid or flexible piece of material manually installed on the surface to be painted, without special care, since the accuracy of the limit of the mask is obtained via the automatically applied layer(s).

The invention also concerns an installation which allows implementing the above-mentioned method and, more particularly, an installation for painting a surface of a component with a pattern, this installation comprising at least one first applicator for applying a first coating product on the surface and at least one second applicator for applying a second coating product on the surface. According to the invention, this installation also includes an automatic applicator for automatically applying, on the surface, at least a portion of a mask.

BRIEF DESCRIPTION OF THE DRAWINGS

The invention will be better understood on the basis of the following description which is given in correspondence with the annexed figures and as an illustrative example, without restricting the object of the invention. In the annexed figures.

DETAILED DESCRIPTION OF SOME EMBODIMENTS

Figure 1:
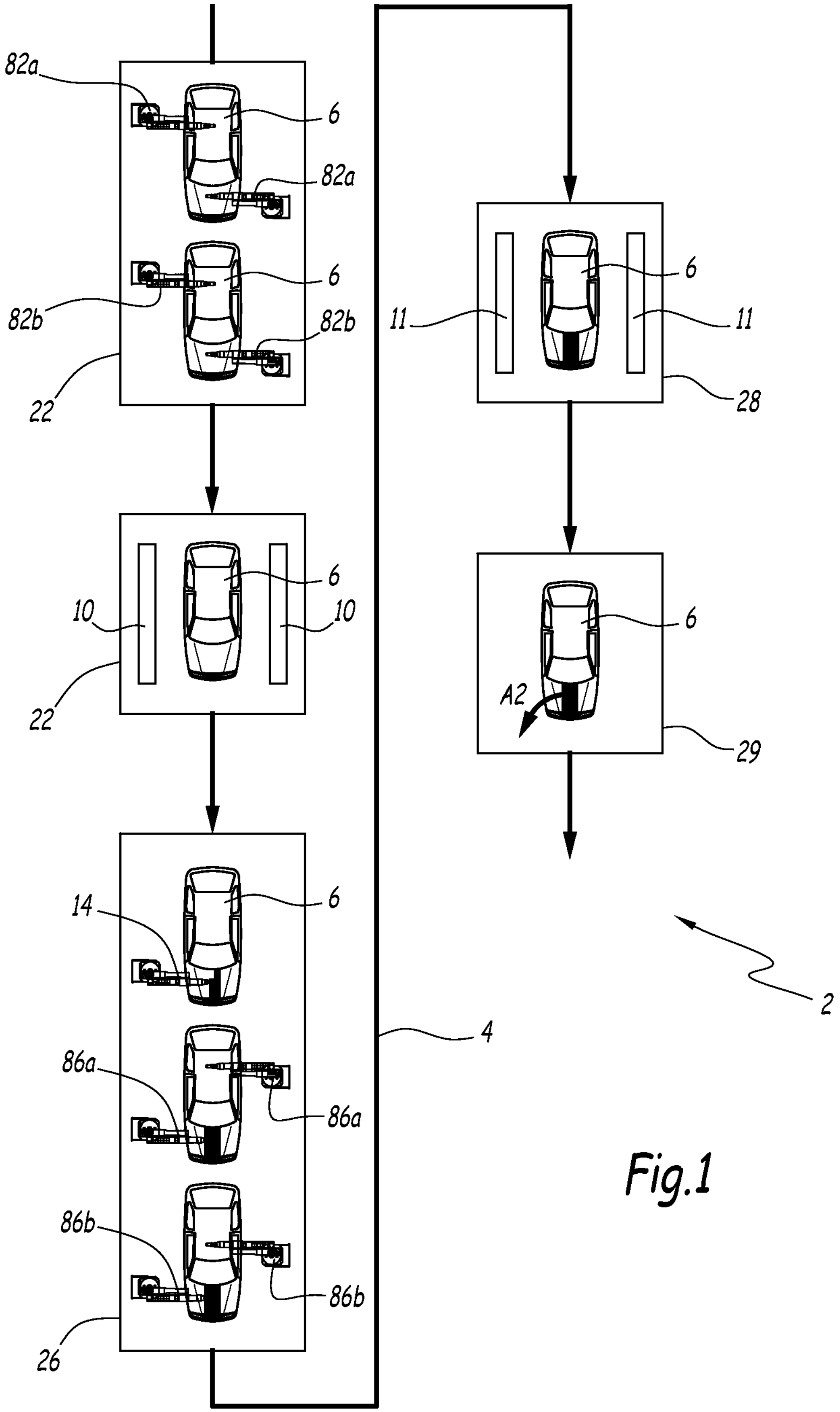
FIG. 1 is a schematic top view of an installation according to the invention for implementing a method according to the invention.
Figure 2:
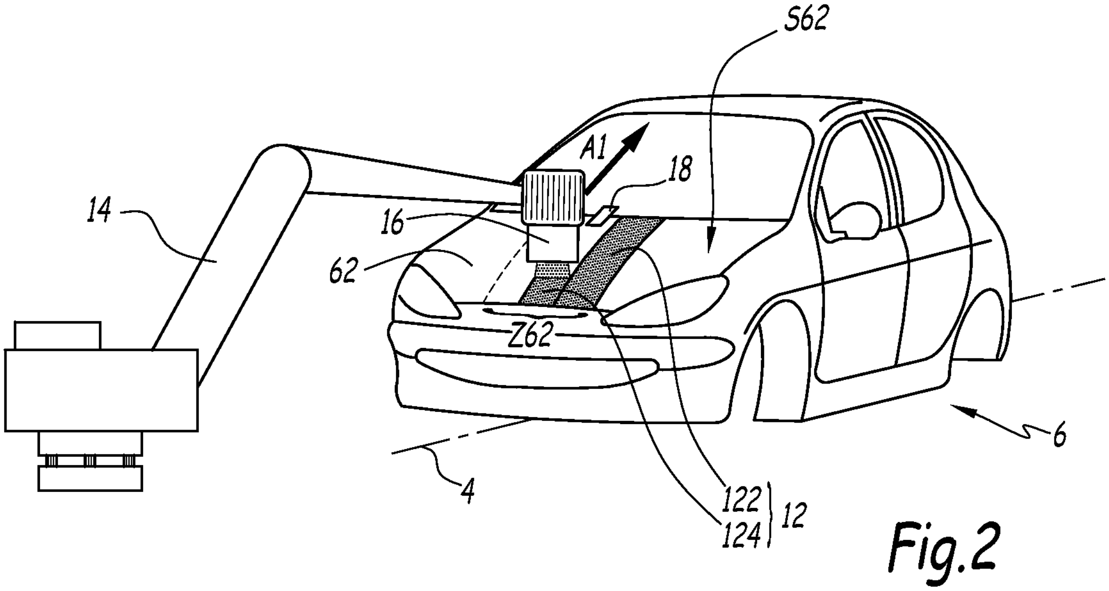
FIG. 2 is a partial perspective view of the installation of FIG. 1.

The installation 2 represented on FIGS. 1 and 2 is meant for implementing a method for painting the whole surface of a car body with a layer of paint including a pattern. More precisely, the whole car body is supposed to be covered with paint, the paint having two colors, namely a first color on a first portion of its surface and a second color on a second portion of this surface.

In the example of the figures, the method is implemented for painting a vehicle with a central zone on its hood where the color of the vehicle is different from the remaining portion of the hood.

According to non represented alternative embodiments of the invention, the repartition of the two colors of the pattern might be different.

Also, a pattern can be obtained by using a single base coat and different clear coats with different effects such as shining, mat or structured. A clear coat is sometimes also called a varnish.

Installation 2 includes a conveyor 4 which moves car bodies 6 along a conveying direction.

In a first booth 22 of installation 2, some multi-axis robots 82*a* are used to spray a first base coat, with a first color, on car bodies 6. Multi-axis robots 82*a* are equipped with pneumatic or rotary sprayers, preferably electrostatic sprayers. These sprayers can be of the air spray, airmix or airless type.

In a second station of booth 22, some multi-axis robots 82*b* are used for spraying a clear coat on car bodies 6. Multi-axis robots 82*b* are equipped with sprayers which can be of the same type as the sprayers of multi-axis robots 82*a*.

Application of the first base coat occurs during a first step 1002 of the method of the invention. Application of the clear coat occurs in a second step 1006 of the method.

After steps 1002 and 1006, each car body is conveyed by conveyor 4 into an oven 24 where it is heated or baked with heaters 10. This occurs in a third step 1010 of the method of the invention.

After baking, each car body is conveyed by a conveyor 4 towards a second booth 26 which includes three successive stations.

In a first station, a mask 12 is applied on the hood 62 of each car body 6, in a further step 1014. A shown on FIG. 4 which partly represents this first station, mask 12 is formed of three ribbons 122, 124 and 126 located, adjacent to each other, in a central zone Z62 of the upper surface S62 of hood 62. This allows painting the remaining portion of hood 62 with a second base coat having a color different from the first base coat, while keeping the color of the first base coat in the central zone Z62 of hood 62 covered by mask 12.

Each ribbon is automatically applied, in the form of a layer of non-atomized fluid, by a multi-axis robot 14 equipped with an applicator 16 of the same type as the one described in US-A-2015/0367620 whose content is included in the present description by reference.

Applicator 16 is an extension die fed, via non represented pipes, with water and a material used for creating mask 12. The mixture of water and material is expelled by pressure out of applicator 16, in the form of an emulsion.

In fact, in this example, the material applied is a copolymer emulsion. This emulsion is delivered as such by the product manufacturer. The emulsion is not made locally. Alternatively, the emulsion can be made locally.

The equipment used to pressurize the emulsion is a cylinder which is filled between application phases. During application, the piston of the cylinder is pushed by pressurized air or by an electrical motor. The material applied by applicator 16 could also be expelled in the form of a scurry, a liquid or a gel. Contrarily to the base coat and clear coat applied at steps 1002 and 1006, this expelled material is not atomized.

Applicator 16 allows applying each ribbon 122, 124 or 126 in the form of a layer of non-atomized fluid. In particular; this fluid can be an aqueous solution of polyvinyl acetate (PVA) or an emulsion of acrylic copolymer. Advantageously, the ratio of polymer to water in the applied fluid is about 50/50. However, it can vary according to the application.

On FIG. 2, mask 12 is in the process of being applied. Ribbon 122 is already applied, ribbon 124 is partially applied and ribbon 126 is not yet applied on zone Z62.

Ribbons 122, 124 and 126 are next to each other with a slight overlap 128 between two adjacent ribbons, which avoids any risk of polluting zone Z62 of hood 62 covered by mask 12. The overlap can be more or less important depending on the shape of the area to be covered. It is advantageous to obtain at least one sharp edge out of the two lateral edges of the ribbon.

The flow rate of fluid to applicator 16 is selected to generate a ribbon of a uniform or quasi-uniform thickness, in the range of 200 μm, and a width of about 95 mm. Actually, the cross section of the applied ribbon is globally "rectangular" and there is very little difference of thickness between the edges and the middle of the ribbon. Usually, with extruded material the edges are thicker than the middle, which corresponds to the so-called "horn effect". The dye of US-A-2015/0367620, which is used in the present invention, avoids this problem.

The application distance, that is a distance between the outlet of applicator 16 and zone Z62 of upper surface S62, is selected between 3 and 10 mm, preferably equal to about 6 mm which corresponds to the distance at which the material coming out of applicator 16 has a substantially constant width. This application distance is measured perpendicularly to upper surface S62. With a 3D shape of hood 62 it is not possible to have a perfectly constant distance between every point of the dye slot and upper surface S62. However it is important to have the non overlapped edge at the right distance of the dye, because it will define the quality of the line between the 2 paints.

The speed of displacement of applicator 16 in its direction of displacement represented by arrow A1 on FIG. 2, which is substantially parallel to upper surface S62, is adapted to the speed of extrusion of the ribbon out of applicator 16, in order to obtain a uniform thickness and to avoid wavy edges on mask 12. In practice, the speed of displacement of the applicator in the direction of arrow A1 is similar to the speed of extrusion of the ribbon, that is equal to this speed of extrusion plus or minus 5%.

Thanks to the application of mask 12 in the form of ribbons of non-atomized fluid, it is possible to apply mask 12 automatically with a robot, such as multi-axis robot 14. This allows a quick, reproducible and precise application of mask 12. Moreover, because of the structure of the ribbons 122, 124 and 126, there is no risk that paint applied later on hood 62 migrates under mask 12.

Actually, mask 12 can be called a "LAM" for Liquid Applied Mask since ribbons are applied in a liquid or quasi-liquid form at step 1014.

Once mask 12 has been applied in step 1014, as explained here-above, conveyor 4 moves each car body towards second and third stations of booth 26 where a second base coat is applied on surface S62 with multi-axis robots 86*a* and clear coat is applied with multi-axis robots 86*b*, in the same way as in booth 22. This occurs in two successive steps of the method of the invention, namely a step 1018 of application of the second base coat with the second color and a step 1022 of application of a clear coat which can be the same as the one used in step 1006 or a different one. Multi-axis robots 86*a* and 86*b* are also equipped with sprayers which can be the same as the ones of multi-axis robots 82*a* and/or 82*b*.

Thereafter, conveyor 4 conveys each car body towards a second oven 28 provided with heaters 11 which allows heating or baking the LAM 12, the second base coat and the clear coat. This occurs in a further step 1026 of the method.

Thereafter, in a further step 1030, the mask 12 is removed from hood 62, as shown by arrow A2 on FIG. 1. This occurs in a station 29 of installation 2 located downstream of oven 28 along conveyor 4.

In order for step 1030 to be implemented easily, that is in order for mask 12 to be removed in one piece, mask 12 should not be too elastic at this stage. This is why, during step 26, baking should occur at a temperature comprised between 100° and 160° C., preferably between 120° and 140° C. In practice, the temperature of 130° C. has proven sufficient for curing the ribbons in order for them to form a relatively strong one-piece mask 12 which can be easily removed. In order for the baking of step 1026 to be efficient, it should take place for a duration comprised between 10 and 30 mm. The duration of 20 mm has proven sufficient.

The Liquid Applied Mask material is chosen to adapt to a standard paint curing process. It becomes dry and with a very limited elasticity when cured together with a layer of base coat and clear coat above without changing the curing parameters used to bake the paint.

In order to facilitate removal of mask 12 at step 1030, and according to an advantageous but not compulsory aspect of the method, a tab 18 is temporarily immobilized on central zone Z62 of hood 62. Tab 18 can be partly covered with removable glue, with a double side adhesive tape or with a single side adhesive tape covering the tab and the surface to be coated, in order to stick to hood 62 prior to the application of LAM 12, as shown on FIG. 2.

Figure 4:
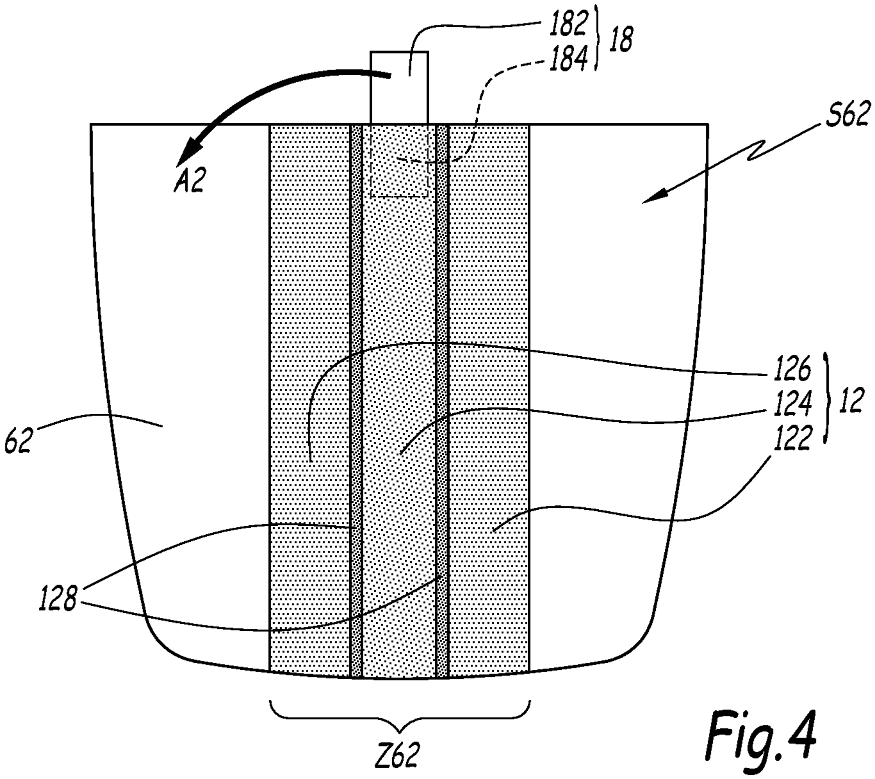
FIG. 4 is a top view of a hood of the vehicle represented on FIG. 2 once a mask has been fully applied.

As shown on FIGS. 2 and 4, tab 18 is stuck to central zone Z62 of hood 62 in a configuration where an extremity 182 of tab 18 protrudes out of the upper surface S62 of hood 62 and a portion 184 of tab 18 lies on zone Z62. Once all three ribbons 122 to 126 have been applied on hood 12, portion 184 is covered by ribbon 124 of mask 12.

This allows removing mask 12 by pinching extremity 182 and pulling it away from central zone Z62 as shown by arrow A2 on FIG. 4. The movement of tab 18 is transferred to mask 12. Removal of mask 12 can be performed by a human operator or by a robot pulling on tab 18.

Figure 5:
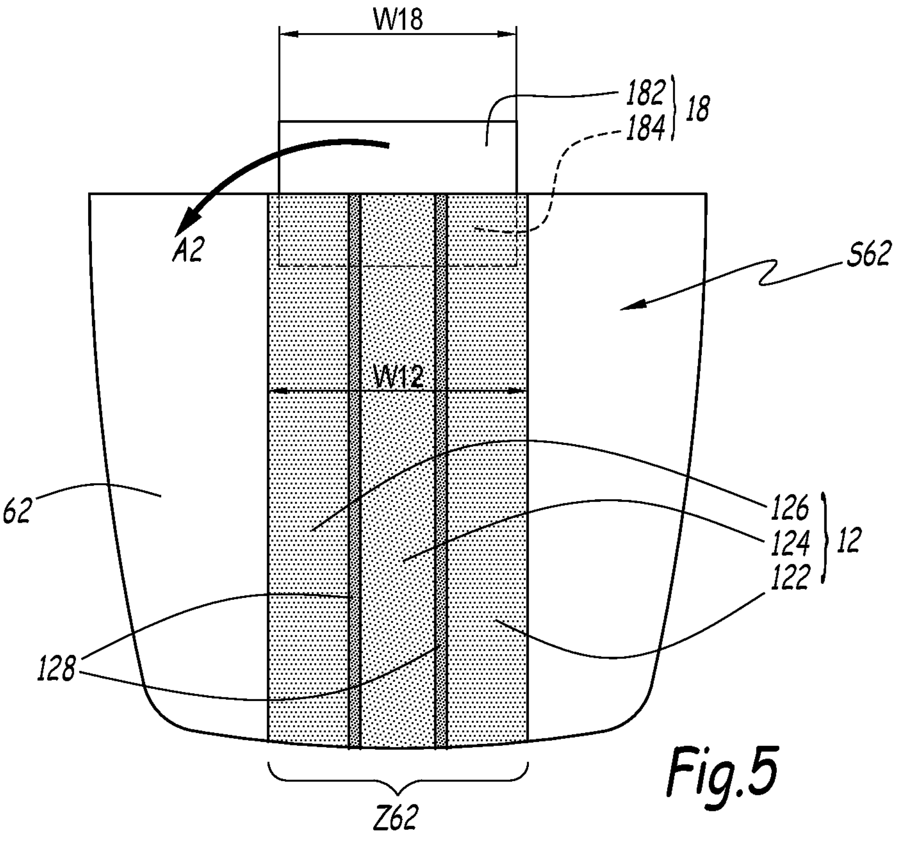
FIG. 5 is a top view of a hood, similar to FIG. 4, for a method according to a second embodiment of the invention.

As shown on FIG. 5 for a second method according to the invention, the width W18 of tab 18 can be substantially equal to the width W12 of mask 12. In particular, tab 18 can be designed with a width large enough for it to be located underneath all ribbons of mask 12, which decreases the risk of tearing off the mask 12 at the level of overlaps 128 when it is removed by pulling on tab 18 at step 1030, as shown by arrow A2.

In the first two methods of the invention, extremity 182 of tab 18 is accessible for a robot or an operator without contact with surface S62.

With the first and second methods mentioned here-above, when mask 12 is removed, the edge of the position of surface S62 painted with the second color is relatively high, because it cumulates the thickness of the second base coat applied at step 1018 and the thickness of the clear coat applied at step 1022. A cliff is made at a transition region between the two colored zones on hood 62, this cliff depending also on the thickness of the mask 12. This transition zone is not smooth.

Regarding the alternative methods of the invention described here-after, the same parts of installation 2 and the same steps of each method bear the same references. Hereafter, only the differences with respect to the first method are explained.

Figure 6:
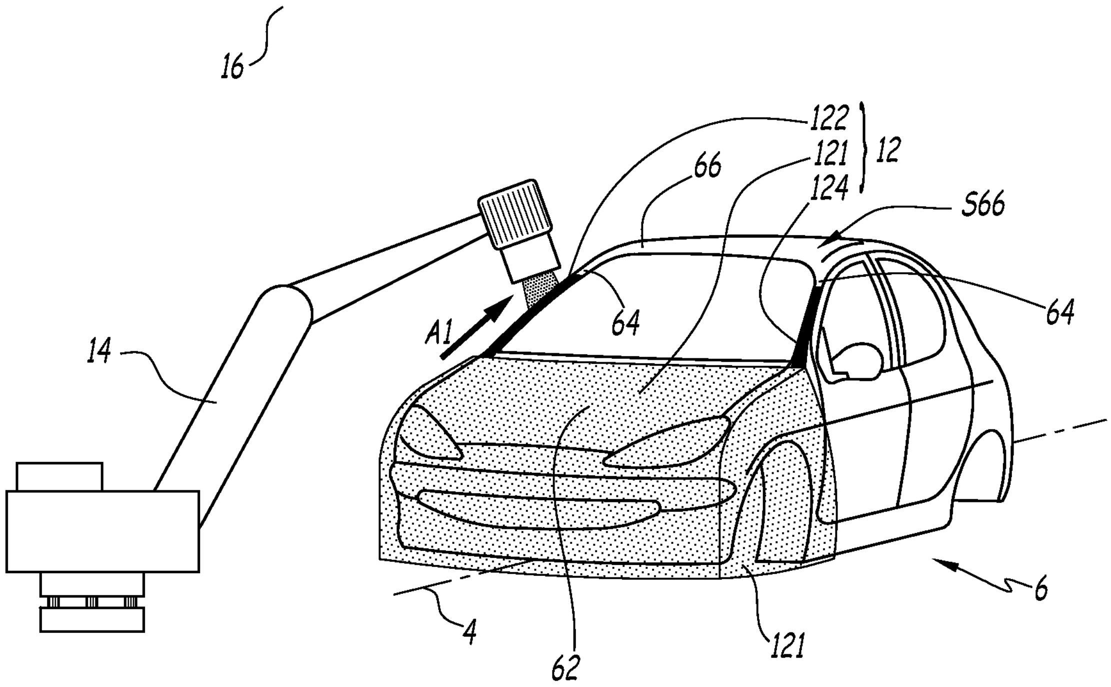
FIG. 6 is a perspective view similar to FIG. 2 for a method according to a third embodiment of the invention.

As shown on FIG. 6 and according to a third method of the invention, the mask 12 can be formed of two parts namely a flexible envelope 121 of a plastic material or paper positioned on the front part of car body 6 and a LAM formed of two ribbons 122 and 124 applied by multi-axis robot 14 and applicator 16 on the two front columns 64 of body 6, on either side of the front window. For the sake of clarity of FIG. 6, envelope 121 is represented as translucent, which is not compulsory. Envelope 121 does not need to be precisely fixed on car body 6 since it does not participate to the definition of the border between the two zones of different colors on car body 6. A similar approach can be used on the rear columns of body 6, which allows painting the whole upper surface S66 of the roof 66 of car body 6 with a color different from its remaining portion at steps 1018 and 1022 of the method. Here again, the limit zone between the two colors on the painted car can be precisely defined because ribbons 122 and 124 are automatically, precisely and reproducibility applied by multi-axis robot 14.

Instead of a flexible envelope 121, a rigid part can be used to cover the front and/or rear portions of car body 6.

Figure 7:
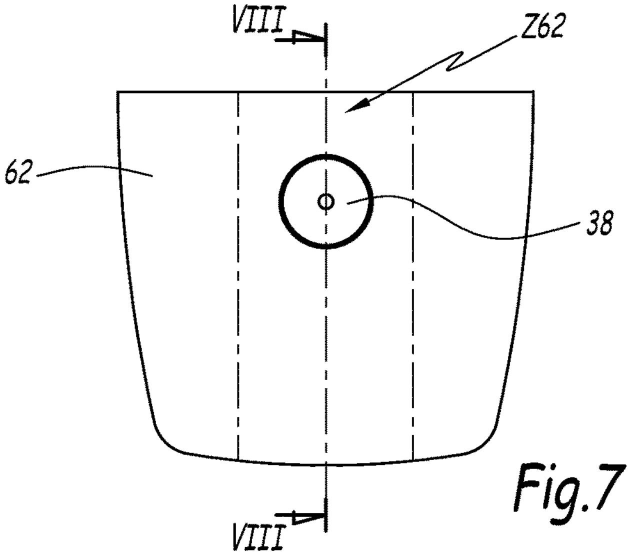
FIG. 7 is a top view of the hood of an automotive vehicle before a mask is applied on this hood during a method according to a fourth embodiment of the invention.
Figure 8:
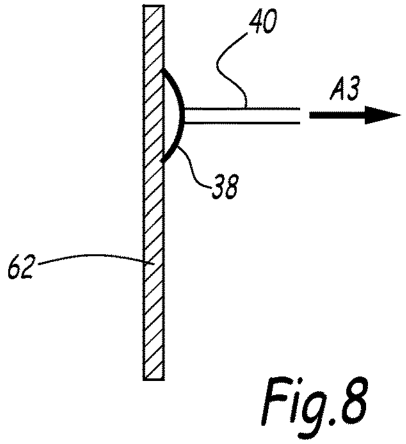
FIG. 8 is a cut view along line VIII-VIII on FIG. 7.
Figure 9:
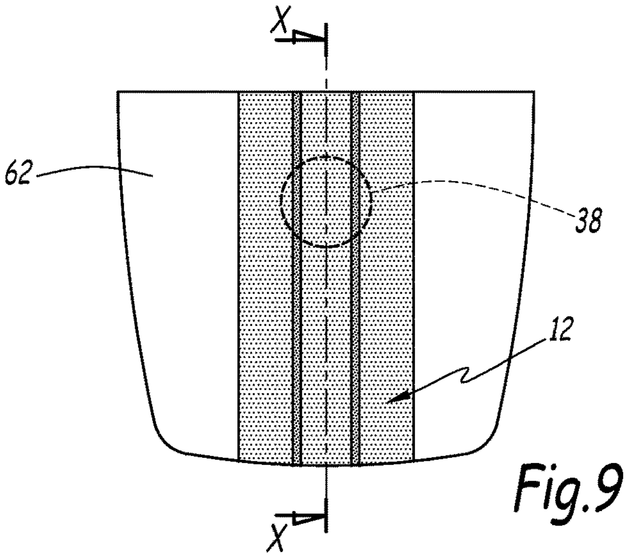
FIG. 9 is a top view similar to FIG. 7 when the mask has been applied.
Figure 10:
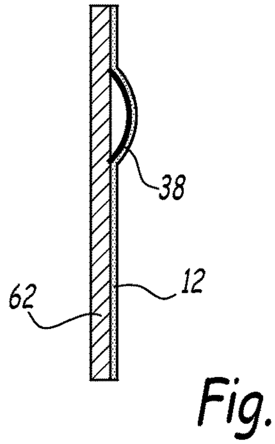
FIG. 10 is a cut view along line X-X on FIG. 9.
Figure 11:
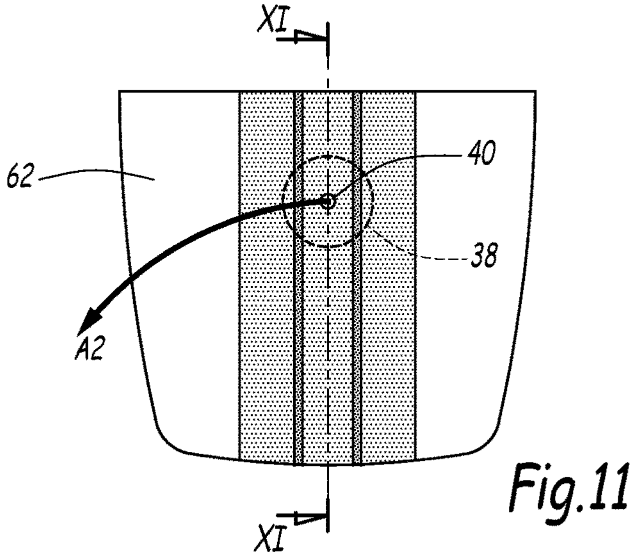
FIG. 11 is a top view similar to FIGS. 7 and 9 when the mask is being removed.

According to the fourth method of the invention represented on FIGS. 7 to 12, removal of the mask can be improved by using a suction cup 38 which is installed on central zone Z62 of hood 62 prior to step 1014, as shown on FIGS. 7 and 8. When suction cup is installed on hood 62, air is removed from it via a tube 40, as shown by arrow A3 on FIG. 8. This guarantees that suction cup 38 remains in position on hood 62.

Thereafter, tube 40 is removed and mask 12 is applied in step 1014, as explained here-above. Mask 12 covers suction cup 38, as shown on FIGS. 9 and 10.

Figure 12:
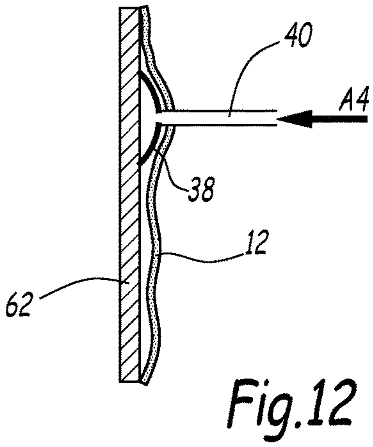
FIG. 12 is a cut view along line XII-XII on FIG. 11.

At step 1030, some air is injected within suction cup 38 via tube 40 which has been re-installed, as shown on FIG. 12 by arrow A4. This air propagates between hood 62 and mask 12, which facilitates removal of mask 12, by pulling on this mask and possibly on tube 40, as shown by arrow A2 on FIG. 11.

Alternatively, a gas different from air can be injected in suction cup 38.

Alternatively, air is injected only in suction cup 38 at step 1030. This allows separating it from surface S62 by pulling on tube 40.

Figure 13:
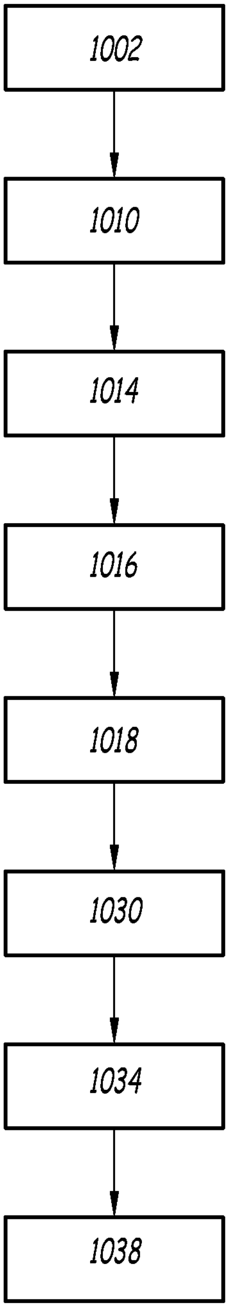
FIG. 13 is a block diagram of a method according to a fifth embodiment of the invention.

In order to avoid a high cliff between two zones of different colors on car body 6, the order of the steps of the method has been modified in the fifth method of the invention represented on FIG. 13.

In this fifth embodiment, one applies a first base coat with a first color, at step 1002. Then, one bakes the first base coat at step 1010.

Thereafter, LAM mask 12 is applied at step 1014 and this mask is baked alone at step 1016.

Thereafter, a second base coat with a second color is applied at step 1018.

Mask 12 is removed at step 1030 when the second base coat is still wet.

Thereafter, clear coat is applied at step 1034 and it is baked at step 1038, together with the second base coat.

This method gives good results in terms of transition between the different zones of different colors, as there is only one layer of clear coat on the whole surface. The edge between the two color zones is difficult to detect by touching. In this method, the mask 12 must be removed very carefully since the second base coat is still wet at step 1030. As compared to the first method of the invention, this fifth method requires an extra oven in installation 2, since it includes three baking steps, namely steps 1010, 1016 and 1038.

Figure 14:
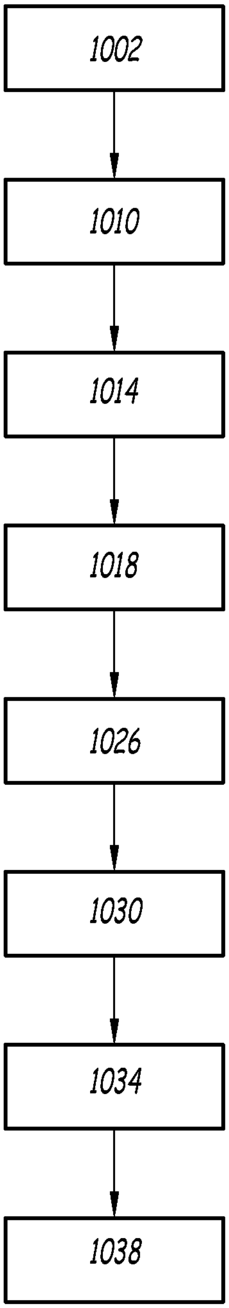
FIG. 14 is a block diagram of a method according to a sixth embodiment of the invention.

Another approach is possible according to the sixth method of the invention represented on FIG. 14. The first three steps 1002, 1010 and 1014 of this method are the same as for the fifth method of FIG. 13.

In the fourth step 1018, one applies the second base coat on the backed first base coat and on the wet mask 12.

Thereafter, the mask 12 and the second base coat are baked in step 1026.

After step 1026, steps 1030, 1034 and 1038 are implemented as in the method of FIG. 13.

This sixth method according to the invention also gives good results in terms of transition, insofar as there is only one layer of clear coat on the whole surface. It also needs three ovens, as the method of FIG. 13. With respect to the method of FIG. 13, the advantage of the method of FIG. 14 is that the second base coat has been baked prior to removal of the mask 12.

In this method, if the second base coat is applied on a relatively small portion of a car body 6, for instance the roof, step 1026 can be performed by local heating of car body 2, thus avoiding the use of a complete oven for step 1026.

A pattern can also be obtained on a vehicle by using two clear coats or varnishes with different effects on a single base coat. This corresponds to the seventh method of the invention represented on FIG. 15.

In this method, one applies a base coat in step 1002 and a first clear coat in a further step 1006.

Figure 3:
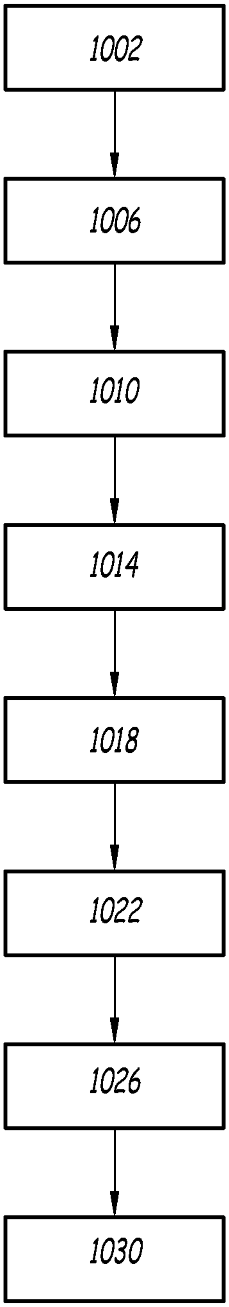
FIG. 3 is a block diagram of a first method according to the invention, implemented on the installation on FIGS. 1 and 2.

Thereafter, baking of the base coat and first clear coat occurs in a step 1010 and LAM 12 is applied at step 1014. These four steps are the same as the ones of the first method represented on FIG. 3.

After step 1014, a second clear coat is applied at step 1022 and it is baked at step 1026 together with mask 12.

Thereafter, mask 12 is removed at step 1030.

Figure 15:
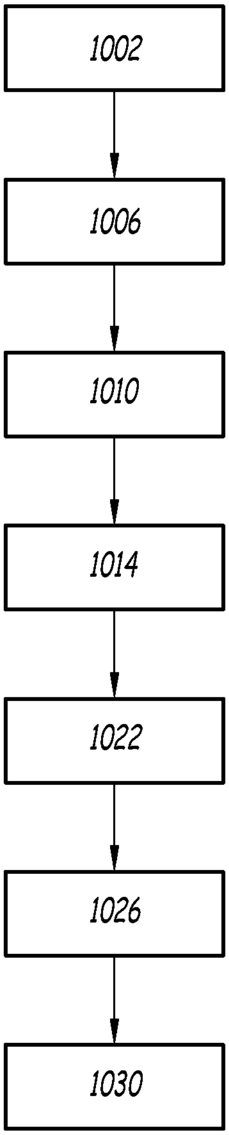
FIG. 15 is a block diagram of a method according to a seventh embodiment of the invention.

The method of FIG. 15 allows obtaining a pattern if first clear coat and second clear coat have different effects, such as shining, mat or structured.

The method of FIG. 15 can be modified in order to be used with two base coats of different colors or more.

The invention has been explained here-above in relation to FIGS. 1 to 14 in case one uses two base coats. However, it can be used with three or more base coats, provided that the steps of the method are adapted.

Instead of multi-axis robot 14, any type of robot can be used to apply LAM 12.

Alternatively, ribbons 122, 124 and 126 do not overlay.

The number of multi-axis robots 82*a*, 82*b*, 86*a*, 86*b* can be different from 2. Similarly, one can use more than one robot 14 and one applicator 16, depending on the surface area of the LAM 12 to be applied.

According to a non represented embodiment of the invention, mask 12 may be made of a single ribbon of non-atomized fluid, in order to decorate the surface with painted stripes having the width of the ribbon.

Installation 2 represented on FIG. 1 is adapted when one implements one of the second to sixth methods.

The invention is explained here-above in relation to an example in the field of car painting. However, other applications are possible, e.g. for painting an aircraft fuselage, a household equipment, a motorcycle, an earthmoving equipment, an agriculture machine, etc. . . .

Further embodiments of the invention can be obtained by combining the features of the embodiments and variants described here-above.

The invention claimed is:

1. A method for painting a surface of a component with a pattern, said method comprising the following steps:

a) applying a first coating product on at least a portion of the surface, wherein the first coating product is a first base coat of paint of a first color, b) automatically applying at least one portion of a mask on a portion of the surface, at least a portion of the mask being applied over the first coating product, wherein the mask is at least partially applied in a form of at least one ribbon of non-atomized fluid, the at least one ribbon being obtained by moving an applicator delivering the non-atomized fluid along a portion of the surface where the mask is to be applied, the applicator being an extrusion die, and a speed of displacement of the applicator with respect to the portion of the surface is similar to a speed of extrusion of the ribbon out of the applicator, c) applying a second coating product as a second base coat of paint on at least a portion of the surface without the mask, d) removing the mask, e) after step b) and prior to step d), baking the mask, f) after step a) and before step b), applying a first clear coat on the first base coat, g) after step f) and before step b), baking the first base coat and the first clear coat, and h) after step c) and before step e), applying a second clear coat on the second base coat and on the portion of the mask made of the at least one ribbon of non-atomized fluid, wherein step c) further includes applying the second base coat of a second color on a portion of the surface not covered by the mask, and applying the second clear coat on a portion of the surface not covered by the mask, the second clear coat having, once dried, an aspect different from an aspect of the first clear coat, during step e), the second base coat and the second clear coat are also baked, and the steps of the method are implemented in the following order: a), f), g), b), c), h), e) and d).

2. The method of claim 1, wherein the mask is applied, as a whole, in the form of at least one ribbon of non-atomized fluid.

3. The method of claim 1, wherein the mask is applied partly in the form of a rigid or flexible piece of material located on a first part of the portion of the surface where the mask is to be applied and partly in the form of the at least one ribbon of non-atomized fluid located on a second part of the portion of the surface.

4. The method of claim 1, wherein the method further comprises the following steps:

h') after step d), applying a third clear coat on the first base coat and the second base coat, and i) after step h'), baking the second base coat and the third clear coat, step c) further comprises applying the second base coat with a second color on a portion of the surface not covered by the mask.

5. The method according to claim 1, wherein:

the method further includes, prior to step b), a further step j) comprising:

temporarily immobilizing at least one removable tab on the portion of the surface where the mask is to be applied, during step j), the tab is temporarily stuck to the portion of the surface where the mask is to be applied, in a configuration where a part of the tab protrudes out of this portion and is accessible without contact with the surface, during step b), the removable tab is at least partially covered by the at least one ribbon of non-atomized fluid, and during step d), the protruding part of the tab is pinched and pulled away from the surface.

6. The method according to claim 1, wherein:

the method further includes, prior to step b), a further step j) comprising:

temporarily immobilizing at least one movable suction cup on the portion of the surface where the mask is to be applied, during step j), the suction cup is temporarily immobilized, by depression, on the portion of the surface where the mask is to be applied, during step b), the suction cup is at least partially covered by the at least one ribbon of non-atomized fluid and during step d), the suction cup is separated from the surface by injection of gas within the internal volume of the suction cup and the removable suction cup is pulled away from the surface.

7. The method according to claim 6, wherein during step d), the suction cup is separated from the surface by injection of gas between the at least one ribbon of non-atomized liquid and the surface.

8. The method according to claim 1, wherein the second color is different than the first color.

9. A method for painting a surface of a component with a pattern, the method comprising the following successive steps:

a) applying a first coating product on at least a portion of the surface, wherein the first coating product is a first base coat of paint of a first color, b) applying a first clear coat on the first base coat, c) baking the first base coat and the first clear coat, d) automatically applying at least one portion of a mask on a portion of the surface, at least a portion of the mask being applied over the first coating product, wherein the mask is at least partially applied in a form of at least one layer of non-atomized fluid, the at least one layer being obtained by moving an applicator delivering the non-atomized fluid along a portion of the surface where the mask is to be applied, e) applying a second clear coat on at least a portion of the surface without the mask, the second clear coat having, once dried, an aspect different from an aspect of the first clear coat, f) baking the mask and the second clear coat, and g) removing the mask.

10. The method of claim 9, wherein the mask is applied as a whole, in the form of at least one ribbon of non-atomized fluid.

11. The method of claim 9, wherein the mask is applied partly in the form of a rigid or flexible piece of material located on a first part of the portion of the surface where the mask is to be applied and partly in the form of the at least one ribbon of non-atomized fluid located on a second part of the portion of the surface.

12. The method of claim 9, wherein the method further comprises the following steps:

h') after step d), applying a third clear coat on the first base coat and the second base coat, and i) after step h'), baking the second base coat and the third clear coat, step c) further comprises applying the second base coat with a second color on a portion of the surface not covered by the mask.

13. The method of claim 9, wherein: step c) further comprises applying the second clear coat on a portion of the surface not covered by the mask, the second clear coat having, once dried, an aspect different from an aspect of the first clear coat.

14. The method according to claim 9, wherein:

the method further includes, prior to step b), a further step j) comprising:

temporarily immobilizing at least one removable tab on the portion of the surface where the mask is to be applied, during step j), the tab is temporarily stuck to the portion of the surface where the mask is to be applied, in a configuration where a part of the tab protrudes out of this portion and is accessible without contact with the surface, during step b), the removable tab is at least partially covered by the at least one ribbon of non-atomized fluid, and during step d), the protruding part of the tab is pinched and pulled away from the surface.

15. The method according to claim 9, wherein:

the method further includes, prior to step b), a further step j) comprising:

temporarily immobilizing at least one movable suction cup on the portion of the surface where the mask is to be applied, during step j), the suction cup is temporarily immobilized, by depression, on the portion of the surface where the mask is to be applied, during step b), the suction cup is at least partially covered by the at least one ribbon of non-atomized fluid and during step d), the suction cup is separated from the surface by injection of gas within the internal volume of the suction cup and the removable suction cup is pulled away from the surface.

16. The method according to claim 15, wherein during step d), the suction cup is separated from the surface by injection of gas between the at least one ribbon of non-atomized liquid and the surface.

17. The method according to claim 9, wherein the second color is different than the first color.

* * * * *